(12) United States Patent
Ozcan et al.

(10) Patent No.: US 11,225,907 B2
(45) Date of Patent: Jan. 18, 2022

(54) GAS TURBINE ENGINE PIPE COVER

(71) Applicant: General Electric Company, Schenectady, NY (US)

(72) Inventors: Evren Ozcan, Eindhoven (NL); Scott Alan Schimmels, Miamisburg, OH (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 15/041,662

(22) Filed: Feb. 11, 2016

(65) Prior Publication Data

US 2017/0234228 A1    Aug. 17, 2017

(51) Int. Cl.
*F02C 7/00* (2006.01)
*F02C 7/22* (2006.01)
*F02C 7/24* (2006.01)

(52) U.S. Cl.
CPC ............... *F02C 7/222* (2013.01); *F02C 7/24* (2013.01)

(58) Field of Classification Search
CPC .......... F02C 7/24; F02C 7/222; F01D 25/005; F16L 59/08; F16L 11/12; F16L 21/00; F16L 59/14; F16L 59/00; F17C 2203/0308; F17C 2203/032; F05D 2260/231; F23R 3/28; F23K 5/16; F23K 2301/20; F23K 2203/10
See application file for complete search history.

(56) References Cited

U.S. PATENT DOCUMENTS

| | | | |
|---|---|---|---|
| 3,088,170 A | | 5/1963 | Strong |
| 4,384,697 A | | 5/1983 | Ruhe |
| 5,771,696 A | * | 6/1998 | Hansel .................. F23D 23/00 60/739 |
| 5,813,454 A | | 9/1998 | Potter |
| 6,887,543 B1 | * | 5/2005 | Louart ................ B29D 23/001 138/118 |
| 7,992,390 B2 | | 8/2011 | Patel et al. |
| 8,408,003 B2 | | 4/2013 | Hardwicke et al. |
| 2006/0029777 A1 | * | 2/2006 | Yanai ..................... E04B 1/806 428/178 |
| 2011/0000572 A1 | * | 1/2011 | Ramaswamy ........... B32B 1/08 138/149 |
| 2011/0236184 A1 | | 9/2011 | Benkler et al. |
| 2015/0113937 A1 | * | 4/2015 | Bleeker .................. F02C 7/222 60/39.091 |

FOREIGN PATENT DOCUMENTS

| | | |
|---|---|---|
| CN | 2129303 Y | 4/1993 |
| CN | 1945094 A | 4/2007 |
| CN | 101469793 A | 7/2009 |
| CN | 102072573 A | 5/2011 |
| DE | 2918619 A | 11/1980 |
| DE | 3421326 A1 | 12/1985 |

(Continued)

OTHER PUBLICATIONS

Wikipedia, Emissivity, Aug. 22, 2014.*

(Continued)

*Primary Examiner* — Edwin Kang
(74) *Attorney, Agent, or Firm* — McGarry Bair PC

(57) ABSTRACT

A low emissivity cover for a manifold pipe having an inner ring and an outer ring together which circumscribe the pipe.

21 Claims, 4 Drawing Sheets

(56) References Cited

FOREIGN PATENT DOCUMENTS

| | | | |
|---|---|---|---|
| GB | 1117514 | | 6/1968 |
| GB | 1446335 | | 8/1976 |
| GB | 2249151 A | * 4/1992 | ............ F16L 59/143 |
| JP | 2005226679 A | | 8/2005 |
| JP | 2005226681 A | | 8/2005 |

OTHER PUBLICATIONS

Radiation Heat Transfer, Feb. 29, 2008 (Year: 2008).*
Aherm, John, et al, Gas Turbine System Technician (Mechanical) 3 & 2, 1985 (Year: 1985) (Year: 1985).*
3M, Heat Shrink Tubing and Devices, 2005 (Year: 2005).*
3M, TTS-450 Datasheet, 2011 (Year: 2011).*
Grayline LLC, About Heat Shrink Tubing, 2013 (Year: 2013).*
Machine Design, Heat-Shrink Tubing, 2007 (Year: 2007).*
U.S. Packaging & Wrapping LLC, Shrink Film 101,2016 (Year: 2016).*
Engineering Toolbox, Radiation Heat Transfer, Feb. 29, 2008 (Year: 2008).*

* cited by examiner

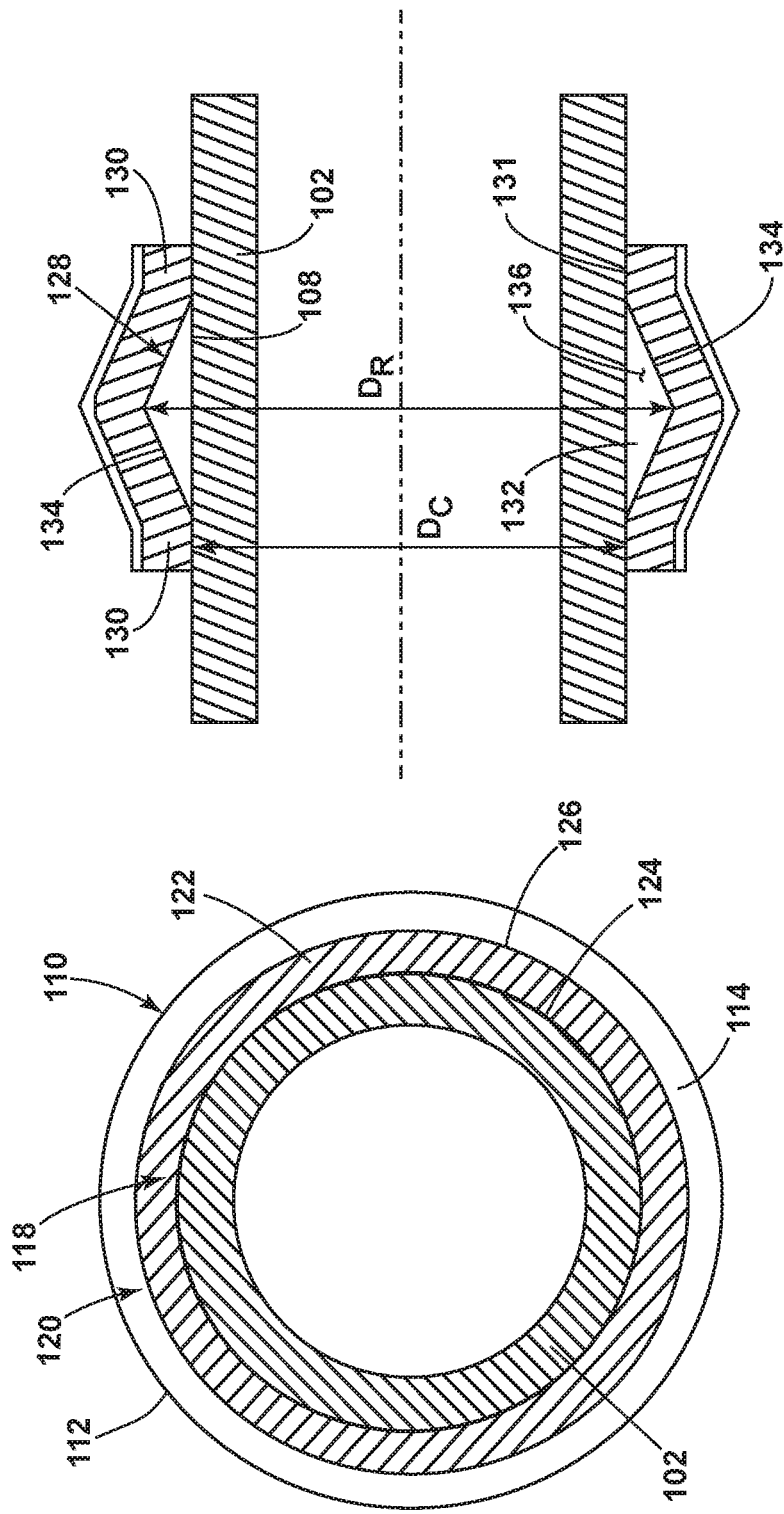

GAS TURBINE ENGINE PIPE COVER

BACKGROUND OF THE INVENTION

Turbine engines, and particularly gas or combustion turbine engines, are rotary engines that extract energy from a flow of combusted gases passing through the engine in particular a combustor section onto a multitude of rotating turbine blades. The combustor section includes a manifold through which fuel is supplied to the combustor. The manifold has a plurality of pipes fluidly coupled to the combustor, which can reach extremely high temperatures.

The pipes within the manifold are covered in insulation to prevent radiation from the combustor heating the pipes and the fuel passing through the pipes. The insulation decreases the pipe wetted wall temperatures (external temperature of the pipes while fuel passes through). The insulation is provided during manufacturing of the engine and is replaced repeatedly over the life span of an engine. Gaps and spaces in insulation are required because small working spaces, mounting bracket placements, and bends and breaks in the manifold, prevent the insulation to cover 100% of the pipes with current installation techniques. These gaps and spaces provide areas where the radiation from the combustor can still undesirably heat the fuel passing through.

BRIEF DESCRIPTION OF THE INVENTION

In one aspect, embodiments relate to a gas turbine engine comprising an engine core, a manifold having a plurality of pipes fluidly coupled to the engine core, insulation provided on some, but not all, portions of the pipes to define at least one non-insulated portion, and a low emissivity cover provided on the at least one non-insulated portion.

In another aspect, embodiments relate to a low emissivity ring for a manifold pipe comprising a heat-shrinkable inner ring and a low emissivity outer ring circumscribing the inner ring.

In yet another aspect, embodiments relate to a method of controlling heat transfer into a non-insulated portion of a manifold pipe of a gas turbine engine by reflecting at least 90% of the radiant heat from the non-insulated portion.

BRIEF DESCRIPTION OF THE DRAWINGS

In the drawings:

FIG. 3 is a cross sectional view of the pipe cover of FIG. 2B.

FIG. 4 is a cross sectional profile view of the pipe cover of FIG. 2B.

DESCRIPTION OF EMBODIMENTS OF THE INVENTION

Figure 1:
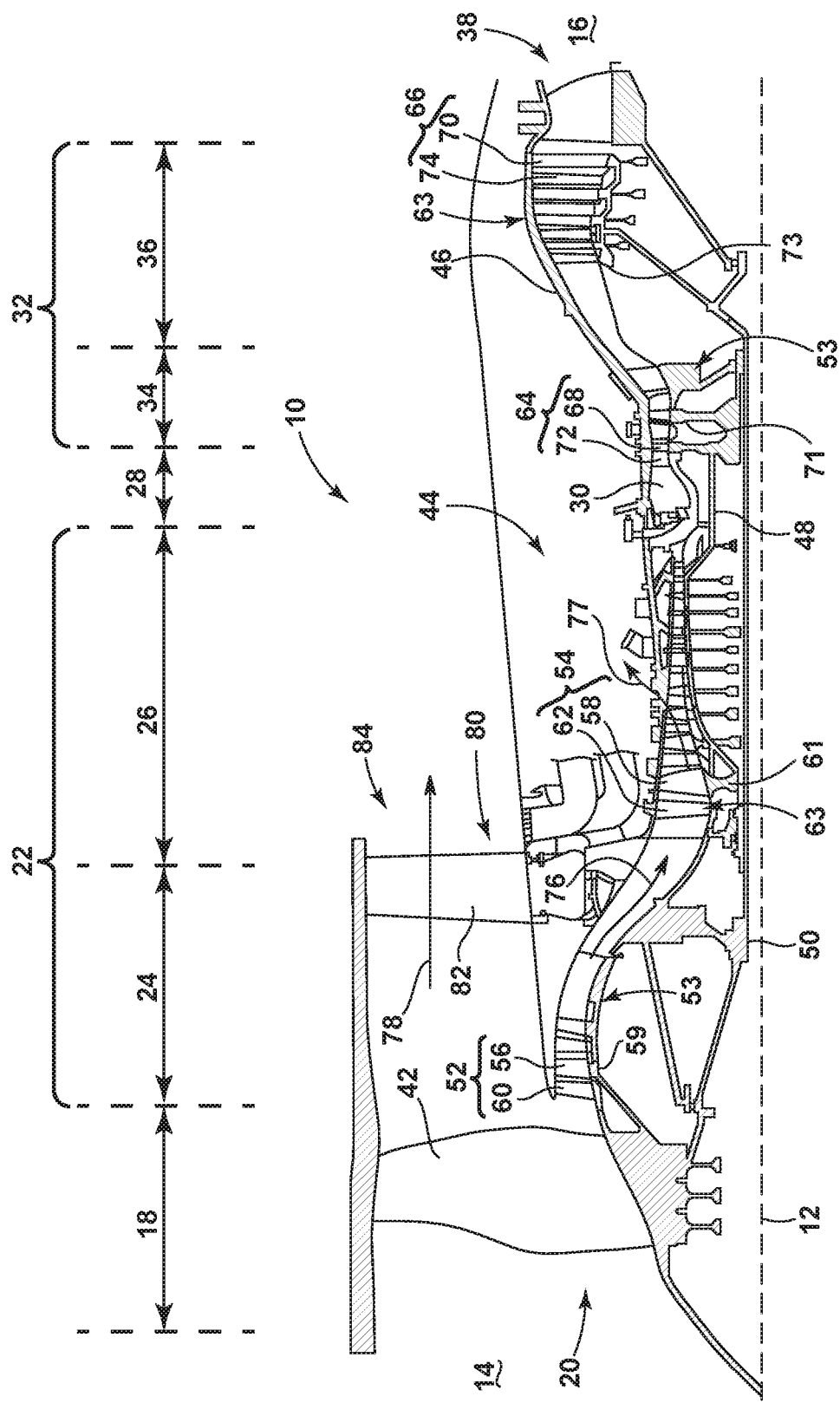
FIG. 1 is a schematic cross-sectional diagram of a gas turbine engine for an aircraft.

The described embodiments of the present invention are directed to a pipe cover, especially a low emissivity cover, for a manifold having a plurality of pipes. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2A:
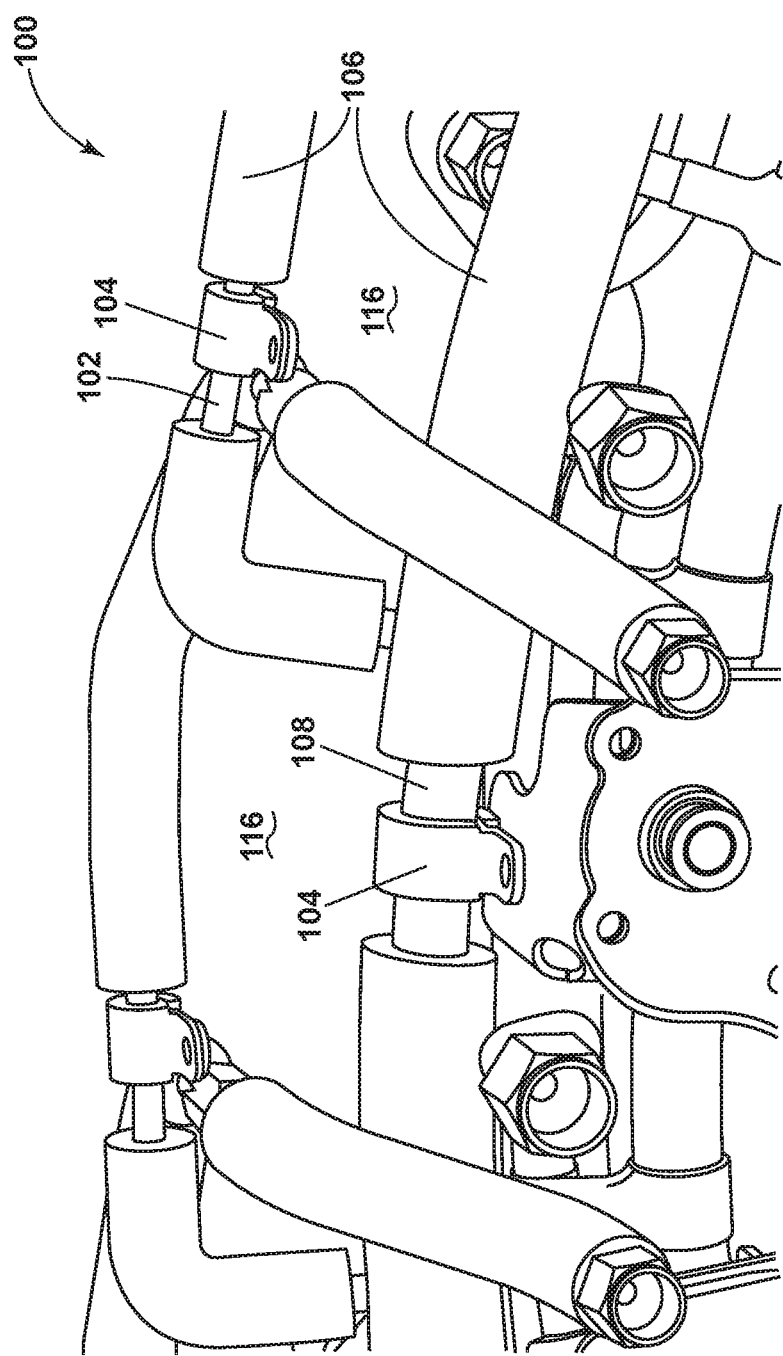
FIG. 2A is a perspective view of a manifold section of the gas turbine engine of FIG. 1 illustrating gaps in the insulation.

FIG. 2A depicts a section of the engine 10 having a fuel manifold 100 located in an area near and surrounding the combustion chamber 30. The fuel manifold 100 has a plurality of pipes 102 fluidly coupled to the engine core 44. The pipes 102 are installed with mounting brackets 104. Insulation 106 is provided on some, but not all portions of the pipes 102 defining at least one non-insulated portion 108. During assembly of the engine 10, insulation 106 is applied to the pipes 102. Insulation 106 is also reapplied when needed throughout the life span of the engine 10. The non-insulated portions 108 are created due to a small working space and the inability to reapply insulation 106 up and abutting the mounting brackets 104.

Figure 2B:
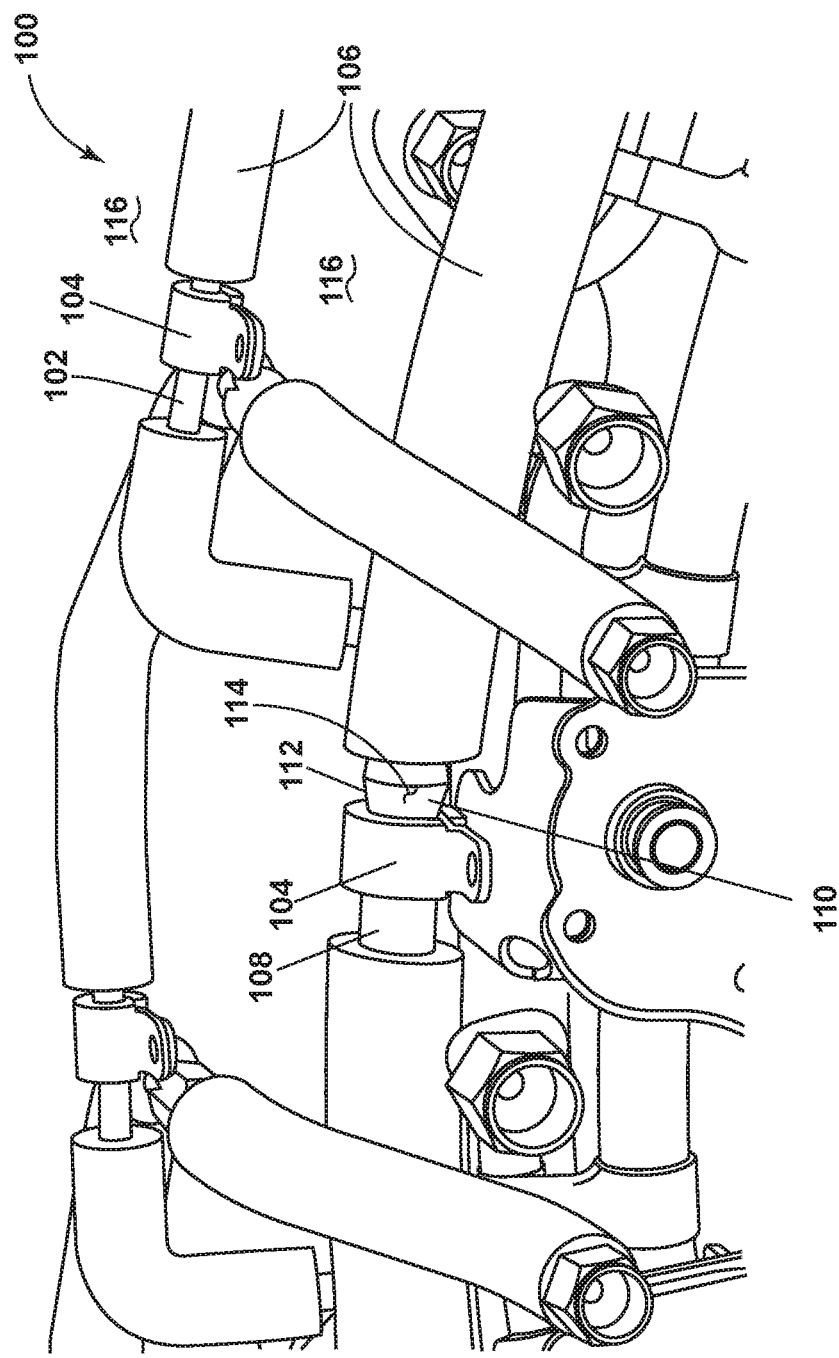
FIG. 2B is a perspective view of a manifold section of the gas turbine engine of FIG. 1 with a pipe cover according to a first embodiment of the invention located within the gaps in the insulation.

FIG. 2B illustrates the same section of the engine 10 as FIG. 2A. A low emissivity cover 110, simply referred to herein as cover, is provided on one of the non-insulated portions 108. This cover 110 comprises a ring 112 which circumscribes the non-insulated portion 108 leaving a low emissivity layer 114 exposed to a region 116 surrounding the manifold 100. The cover 110 can be placed on a plurality of non-insulated portions 108 as needed and is detachable.

In a cross-section view of FIG. 3 the low emissivity ring 112 is illustrated comprising an inner ring 118 and an outer ring 120. The inner ring 118 is a structural layer 122 that is heat shrinkable. The structural layer 122 includes an inner surface 124 confronting the non-insulated portion and an outer surface 126 onto which the low emissivity layer 114 is provided. The low emissivity layer 114 having an emissivity of 0.07 or less, for example 0.04 or 0.03, is coated onto the structural layer 122 and is thinner than the structural layer 122. Materials falling in this range include but are not limited to polished silver, steel, tungsten, or magnesium. Generally emissivity and reflectivity are closely related, therefore polished metals described herein reflect at least 90% of incident radiation.

FIG. 4 is a cross-sectional profile view of the cover 110 with a tapered shape portion 128 terminating in collars 130 being axially opposed portions to define a void 132 between the cover 110 and the non-insulated portion 108 of the pipe 102. The tapered shape 128 is useful in heat-shrinking the collars 130 around the pipe 102. The axial ends 131 of the collars 130 form an inner diameter Dc sized to abut the pipe 102. A recessed portion 134 comprising the void 132 and between the collars 130 defines an inner diameter DR greater than the inner diameter Dc of the collars 130. The void 132 extends about the circumference of the pipe 102 forming a circumferential conduit of air 136 around the pipe 102. The resulting conduit of air 136 is an additional insulator. Along with having the conduit of air 136 as a low conducting material, the contact surface between the ring 112 and the pipe 102 is minimized, reducing any conduction heat transfer.

The pipe 102 is protected from radiation in the region surrounding the manifold 100 by both the low emissivity layer 114 and the conduit of air 136. The insulation provides a reduction of at least 8 times in net BTU/h through the non-insulated portion 108 as compared to an absence of the cover 110 on the non-insulated portion 108. The pipe 102, at the location of the cover, also has at least a 50° F. reduction in wetted wall temperature of the non-insulated portion 108 as compared to the absence of the cover 110 on the non-insulated portion 108. Testing performed with and without the cover using silver for the low emissivity layer produced the following tabulated results.

| Cover: Silver Coating (Emissivity 0.07) | Without Cover | With Cover | Reduction |
|---|---|---|---|
| Net rate of Radiation Heat transfer [Btu/h] | 15.2 | 1.4 | 10.9x |
| Wetted Wall Temperature [° F.] | 342 | 280 | 62° F. |

A method for controlling heat transfer into a non-insulated portion of a manifold pipe of gas turbine includes reflecting at least 90% of the radiant heat surrounding the non-insulated portion using the low emissivity ring cover 110 described herein.

Benefits to the low emissivity cover include protecting pipe regions from radiation heat transfer from areas surrounding the manifold piping in gas turbine engines prone to high radiative heat load. The heat shrinkable ring can be applied locally and can be relocated by undoing the shrink-fitted attachment by heating the ring. The air conduit resulting from the taper shape of the ring acts as an additional insulator to maximize the insulation effect of the ring.

The effect is that radiation heat transfer is cut with a minimum of ten times compared to original. Wall temperature also drops due to insulation effect which decreased local risk of hot-spots and coking.

The local radiation protection for any manifold pipe reduces hot-spots which will not only allow temperature requirements to be met more easily, but in the case of fuel flow also reduces the risk of coking due to avoidance of local hot-spots. The low emissivity cover prevents costly risks and allows engine to perform at higher temperatures as critical regions can be protected from radiation and therefore improve engine efficiency and performance.

Testing has been performed on the low emissivity cover using a polished silver coating, emissivity of 0.07, for the low emissivity layer, which resulted in a decreased net rate of radiation heat transfer by a factor of 10 and wetted wall temperatures of manifold piping decreasing by 62° F. (22% compared to original).

It should be appreciated that application of the disclosed design is not limited to turbine engines with fan and booster sections, but is applicable to turbojets and turbo engines as well. It should be further understood that shrink fitting is one type of connection method described herein, other methods of connecting to the cover to the pipe can be contemplated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A gas turbine engine comprising:
   an engine core;
   a manifold having a plurality of pipes fluidly coupled to the engine core;
   mounting brackets coupled to the plurality of pipes;
   insulation provided on some, but not all, portions of the plurality of pipes;
   at least one non-insulated portion of the plurality of pipes extending between the insulation and the mounting brackets; and
   a low emissivity ring surrounding the at least one non-insulated portion, the low emissivity ring comprising:
   an inner ring defining a structural layer having an inner surface and an outer surface, the inner surface confronting the at least one non-insulated portion and including at least a portion spaced from the at least one non-insulated portion to form a void, and defining a cross-sectional profile with a tapered portion terminating in at least one collar abutting the at least one non-insulated portion to form a circumferential conduit of air within the void; and
   a low emissivity layer provided on the outer surface to reflect incident radiation surrounding the at least one non-insulated portion;
   wherein the tapered portion comprises an apex at a single, constant axial location with respect to a central axis of the at least one non-insulated portion.

2. The gas turbine engine of claim 1 wherein the low emissivity ring has an emissivity of 0.07 or less.

3. The gas turbine engine of claim 2 wherein the emissivity is 0.04 or less.

4. The gas turbine engine of claim 2 wherein the emissivity is 0.03 or less.

5. The gas turbine engine of claim 1 wherein the low emissivity ring has an emissivity sufficient between 8 and 10.9 times reduction in net BTU/h through the at least one non-insulated portion as compared to an absence of the low emissivity ring on the at least one non-insulated portion.

6. The gas turbine engine of claim 1 wherein the low emissivity ring has an emissivity sufficient between 50 and 62 degrees F. reduction in wetted wall temperature of the at least one non-insulated portion as compared to an absence of the low emissivity ring on the at least one non-insulated portion.

7. The gas turbine engine of claim 1 wherein the low emissivity ring circumscribes the at least one non-insulated portion.

8. The gas turbine engine of claim 1 wherein the void extends about a circumference of the at least one non-insulated portion.

9. The gas turbine engine of claim 1 wherein the at least one collar is multiple collars comprising axially opposed portions that are in contact with the at least one non-insulated portion and the void lies between the axially opposed portions.

10. The gas turbine engine of claim 9 wherein the axially opposed portions define axial ends for the low emissivity ring.

11. A low emissivity ring for a manifold pipe comprising an inner ring with a tapered portion terminating in axially opposed collars sized to abut the manifold pipe and a low emissivity outer ring circumscribing the inner ring;
   wherein the low emissivity ring circumscribes the manifold pipe at a non-insulated portion formed between an insulated portion of the manifold pipe and a mounting bracket coupled to the manifold pipe;
   wherein the low emissivity outer ring reflects incident radiation surrounding the manifold pipe; and wherein the tapered portion comprises an apex at a single, constant axial location with respect to a central axis of the non-insulated portion.

12. The low emissivity ring of claim 11 wherein the low emissivity outer ring has an emissivity of 0.07 or less.

13. The low emissivity ring of claim 12 wherein the emissivity is 0.04 or less.

14. The low emissivity ring of claim 13 wherein the emissivity is 0.03 or less.

15. The low emissivity ring of claim 11 wherein the low emissivity ring has an emissivity sufficient for between 8 and 10.9 times reduction in net BTU/h through the manifold pipe as compared to an absence of the low emissivity ring on the manifold pipe.

16. The low emissivity ring of claim 11 wherein the low emissivity ring has an emissivity sufficient between 50 and 62 F reduction in wetted wall temperature of the manifold pipe as compared to an absence of the low emissivity ring on the manifold pipe.

17. The low emissivity ring of claim 11 wherein the axially opposed collars define a first inner diameter.

18. The low emissivity ring of claim 17 wherein the tapered portion further defines a recess portion defining a second inner diameter greater than the first inner diameter of the axially opposed collars.

19. The low emissivity ring of claim 18 wherein the recess portion is located between the axially opposed collars.

20. The low emissivity ring of claim 11 wherein the low emissivity ring is detachable.

21. A low emissivity cover for a manifold pipe having at least one non-insulated portion, the low emissivity cover comprising:
 a ring having a structural layer with an inner surface and an outer surface, the inner surface confronting the manifold pipe; and
 a low emissivity layer provided on the outer surface to reflect incident radiation surrounding the at least one non-insulated portion;
 wherein the low emissivity cover is connected to the manifold pipe at the at least one non-insulated portion formed between an insulated portion of the manifold pipe and a mounting bracket coupled to the manifold pipe;
 wherein the inner surface is spaced from the at least one non-insulated portion to define a void having a cross-sectional profile with a tapered portion terminating in at least one collar abutting the at least one non-insulated portion to form a circumferential conduit of air within the void; and
 wherein the tapered portion comprises an apex at a single, constant axial location with respect to a central axis of the at least one non-insulated portion.

* * * * *